(12) United States Patent
Yan et al.

(10) Patent No.: US 12,009,489 B2
(45) Date of Patent: Jun. 11, 2024

(54) DESULFATION OF LEAD ACID BATTERIES USING ELECTROLYTE AGITATOR

(71) Applicant: GM GLOBAL TECHNOLOGY OPERATIONS LLC, Detroit, MI (US)

(72) Inventors: YiChun Yan, Shanghai (CN); Dave G. Rich, Sterling Heights, MI (US); Saad Hasan, Detroit, MI (US); Lyall K. Winger, Waterloo (CA); Varsha K. Sadekar, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 529 days.

(21) Appl. No.: 17/289,387

(22) PCT Filed: Nov. 9, 2018

(86) PCT No.: PCT/CN2018/114774
§ 371 (c)(1),
(2) Date: Apr. 28, 2021

(87) PCT Pub. No.: WO2020/093359
PCT Pub. Date: May 14, 2020

(65) Prior Publication Data
US 2021/0399354 A1 Dec. 23, 2021

(51) Int. Cl.
*H01M 10/48* (2006.01)
*H01M 10/42* (2006.01)

(52) U.S. Cl.
CPC ....... *H01M 10/484* (2013.01); *H01M 10/425* (2013.01); *H01M 2010/4278* (2013.01); *H01M 2220/20* (2013.01); *H01M 2300/0011* (2013.01)

(58) Field of Classification Search
None
See application file for complete search history.

(56) References Cited

U.S. PATENT DOCUMENTS 6,060,198 A 5/2000 Snaper
2012/0214032 A1 8/2012 Franklin et al.

FOREIGN PATENT DOCUMENTS

| CN | 101501954 A | 8/2009 |
| CN | 101667652 A | 3/2010 |
| CN | 203242715 U | 10/2013 |
| CN | 104538690 A | 4/2015 |

OTHER PUBLICATIONS

International Search Report and Written Opinion of the ISA issued in PCT/CN2018/114774, dated Aug. 8, 2019; ISA/CN.

*Primary Examiner* — Wyatt P McConnell

(57) ABSTRACT

A battery maintenance system includes an enclosure including a plurality of walls. A plurality of battery cells are located in the enclosure and surrounded by electrolyte. An electrolyte agitator such as a piezoelectric device is attached to at least one of the walls of the enclosure and is configured to selectively agitate the electrolyte.

20 Claims, 7 Drawing Sheets

DESULFATION OF LEAD ACID BATTERIES USING ELECTROLYTE AGITATOR

CROSS-REFERENCE TO RELATED APPLICATIONS

This application is a U.S. National Phase Application under 35 U.S.C. 371 of International Application No. PCT/CN2018/114774, filed on Nov. 9, 2018. The entire disclosure of the above application is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery systems, and more particularly to systems and methods for agitating electrolyte in a battery enclosure.

Lead acid (PbA) batteries have been used in a variety of applications including providing power in vehicles. The battery typically includes a plurality of battery cells that are immersed in an electrolyte. When the battery is in a discharged state, positive and negative plates of the cell become lead(II) sulfate ($PbSO_4$) and the electrolyte becomes dilute sulfuric acid ($H_2SO_4$). The discharge process is driven by the conduction of electrons from the negative plate back into the cell at the positive plate through a load.

The negative plate reaction is $Pb(s)+HSO_4(aq) \rightarrow PbSO_4(s)+H+(aq)+2e-$. Conducting electrons that are produced charge one of the plates to a net negative charge. As electrons accumulate, an electric field is created, which attracts hydrogen ions and repels sulfate ions. This leads to a double-layer near a surface of the negative plate. The hydrogen ions screen the negative plate from the solution, which limits further reactions unless charge is allowed to flow.

The positive plate reaction is $PbO_2(s)+HSO_4(aq)+3H^+(aq)+2e^- \rightarrow PbSO_4(s)+2H_2O(l)$. The total reaction can be written as $Pb(s)+PbO2(s)+2H_2SO_4(aq) \rightarrow 2PbSO_4(s)+2H_2O(l)$. In a fully charged state, the negative plate is lead (Pb), the positive plate is lead dioxide ($PbO_2$), and the electrolyte is concentrated sulfuric acid.

The battery loses the ability to accept charge when discharged for too long due to sulfation. Sulfation involves crystallization of lead sulfate. Lead and lead dioxide, the active materials on the plates of the battery, react with sulfuric acid in the electrolyte to form lead sulfate. The lead sulfate initially forms in a finely divided, amorphous state, and easily reverts to lead, lead dioxide and sulfuric acid when the battery recharges. After multiple charge/discharge cycles, some lead sulfate is not recombined into electrolyte and slowly converts into a stable crystalline form that does not revert back during recharging. As a result, less than all of the lead is returned to the battery plates, and the amount of usable active material to produce electricity generation declines.

In addition to sulfation, stratification may also occur. Stratification refers to variations in the composition of the electrolyte from an upper portion of the electrolyte to a lower portion of the electrolyte. Electrolyte such as sulfuric acid has a higher density than water. The battery acid formed at the plates during charging flows downward and collects at the bottom of the battery enclosure. The electrolyte will again reach uniform composition by diffusion over time. However, repeated cycles of partial charging and discharging will increase stratification of the electrolyte. Stratification reduces the capacity and performance of the battery since reduced acid concentration limits plate activation. The stratification also promotes corrosion on an upper portion of the plates and sulfation on a lower portion of the plates.

SUMMARY

A battery maintenance system includes an enclosure including a plurality of walls. A plurality of battery cells are located in the enclosure and surrounded by electrolyte. An electrolyte agitator, attached to at least one of the walls of the enclosure, is configured to selectively agitate the electrolyte.

In other features, the plurality of battery cells include lead acid battery cells and the electrolyte includes sulfuric acid. The electrolyte agitator is located on an outer surface of at least one of the plurality of walls of the enclosure. The electrolyte agitator is located on an inner surface of at least one of the plurality of walls of the enclosure and in direct contact with the electrolyte. The electrolyte agitator includes a piezoelectric device. The electrolyte agitator includes a piezoelectric cantilever.

In other features, the electrolyte agitator is located on an outer surface of at least one of the plurality of walls of the enclosure. An energy dispersion material located between the electrolyte agitator and the electrolyte.

In other features, a feedback device is attached to the enclosure. A controller is configured to control the electrolyte agitator in response to feedback from the feedback device. The electrolyte agitator includes a first piezoelectric device and the feedback device includes a second piezoelectric device.

In other features, the electrolyte agitator is arranged in at least one of plurality of walls located between adjacent ones of the plurality of battery cells. A flyback circuit selectively provides power to the electrolyte agitator.

A vehicle battery system comprises the battery maintenance system. A controller is configured to determine when a vehicle has not been operating for a predetermined period and to cause the electrolyte agitator to agitate the electrolyte after the predetermined period.

In other features, the controller is further configured to cause voltage pulses to be applied to the battery while the vehicle is not operating. The controller is configured to prevent the electrolyte agitator from agitating the electrolyte after the predetermined period if a battery state of charge is less than a predetermined state of charge. The controller is configured to cause the electrolyte agitator to agitate the electrolyte within a predetermined period prior to starting the vehicle.

A vehicle battery system includes an enclosure including a plurality of walls and a plurality of battery cells located in the enclosure and surrounded by electrolyte. An electrolyte agitator, attached to at least one of the walls of the enclosure, is configured to selectively agitate the electrolyte. A drive circuit is configured to selectively drive the electrolyte agitator. A controller is configured to determine when the vehicle has not been operating for a predetermined period and to selectively cause the drive circuit to drive the electrolyte agitator after the predetermined period.

In other features, the controller is configured to prevent the electrolyte agitator from agitating the electrolyte after the predetermined period if a battery state of charge is less than a predetermined state of charge. The controller is configured to cause the electrolyte agitator to agitate the electrolyte within a predetermined period prior to starting the vehicle.

A battery maintenance system includes an enclosure including a plurality of walls and a plurality of battery cells located in the enclosure and surrounded by electrolyte. A piezoelectric device, attached to at least one of the walls of the enclosure, is configured to selectively agitate the electrolyte. A flyback circuit is configured to selectively drive the piezoelectric device. A controller is configured to selectively cause the flyback circuit to output power to the piezoelectric device.

In other features, the plurality of battery cells include lead acid battery cells. The electrolyte includes sulfuric acid. The piezoelectric device includes a piezoelectric cantilever.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
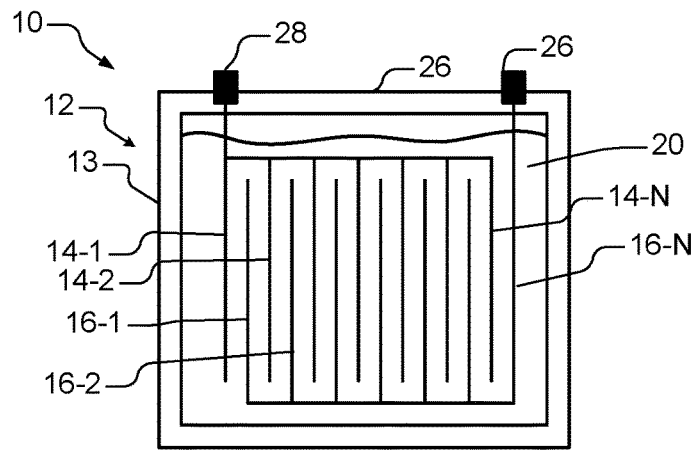
FIG. 1 is a plan view illustrating a battery including multiple battery cells.

While the systems and methods described herein are illustrated in the context of a battery system for a vehicle, the systems and methods descried herein can be used in a number of other vehicle and/or non-vehicle applications. For example, the systems and methods described herein can be used for battery systems in standby power applications and the like.

Desulfation of the battery can be accelerated by creating conditions that increase the solubility of sulfates in the electrolyte solution. For example, desulfation can be accelerated by applying high voltage across terminals of the battery. Systems relying on voltage pulsing alone generally take too long to be useful during typical drive-cycle durations. Voltage pulsing systems may also use voltages and frequencies that are incompatible with other vehicle electrical systems. Voltage pulsing systems also accelerate other degradation mechanisms, such as gassing and corrosion, which limit their usage.

Desulfation can also be accelerated by increasing the temperature of the battery. As described above, sulfation of the battery occurs when the vehicle is parked for long durations. However, desulfation by heating the battery requires a lot of power which will further drain the battery unless an auxiliary power source is available. In addition, systems relying on battery heating alone are not efficient.

Desulfation can also be performed by mixing or increasing circulation of the electrolyte. Periodic overcharging can be performed to create gaseous reaction products at the battery plates and cause convection currents that mix the electrolyte to reduce stratification. Mechanical stirring of the electrolyte provides a similar effect. Batteries in moving vehicles are also subject to sloshing and splashing in the cells as the vehicle accelerates, brakes, and turns. However, sulfation occurs most when the vehicle is parked for longer periods.

Systems and methods according to the present disclosure create targeted agitation of the electrolyte using an electrolyte agitator to desulfate the battery and to remove stratification. In some examples, the electrolyte agitator generates low-frequency sonic waves to cycle fresh electrolyte over the battery plates to remove sulfate growth. The systems and methods according to the present disclosure can be performed when the vehicle is operating or when the vehicle is parked.

In some examples, targeted mechanical agitation of the electrolyte is combined with high voltage pulses to the battery and/or heating of the battery. The systems and methods according to the present disclosure quickly and effectively desulfate batteries and reduce stratification without adversely impacting fuel economy or degrading battery life.

In some examples, the systems and methods described herein automatically perform electrolyte agitation after the vehicle has been parked for a predetermined period. The electrolyte agitation can be repeated thereafter periodically until the vehicle is operated (or on an event basis). In some examples, the electrolyte agitation is suspended when the vehicle remains parked over an extended duration and a battery state of charge (SOC) falls below a predetermined SOC (to prevent the battery from discharging too low).

Electrolyte agitation may improve cold cranking amps (CCA) of the battery if performed on the battery within a predetermined period1 prior to a starting event. While the foregoing description relates to lead acid battery technologies, the systems and methods also improve the value of future carbon-enhanced, lead acid technologies, which offer significantly higher charge acceptance, due to sulfation-prone, high-surface area plates. The systems and methods can also be used for lithium (Li) ion, Li-metal and/or zinc-based batteries (such as nickel (Ni), silver (Ag), etc.) to reduce dendritic growth.

Referring now to FIG. 1, a battery cell 10 includes an enclosure 12 with walls 13 and a cover (not shown). In some examples, the walls 13 of the enclosure are made of polycarbonate or another suitable non-conductive material. The battery cell 10 further includes a first plurality of plates 14-1, 14-2, . . . , and 14-N (collectively first plurality of plates 14) that are connected together and arranged between a second plurality of plates 16-1, 16-2, . . . , and 16-N (collectively second plurality of plates 16) (where N is an integer greater than zero). The first and second plurality of plates 14 and 16 are immersed in an electrolyte solution 20. The first plurality of plates 14 are connected to a first terminal 28 and the second plurality of plates 16 are connected to a second terminal 26. While a specific arrangement of plates and battery terminals is shown, other arrangements can be used.

Figures 2, 3:
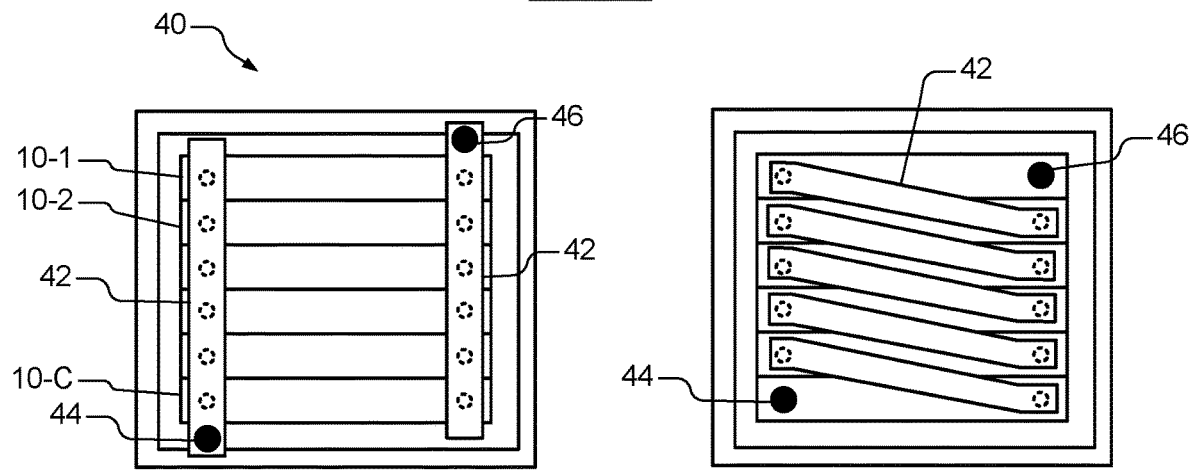
FIGS. 2 and 3 illustrate connection of the battery cells in series and parallel, respectively.

Referring now to FIGS. 2 and 3, a battery 40 typically includes a plurality of battery cells 10-1, 10-2, . . . , and 10-C (collectively battery cells 10) (where C is an integer greater than one) that are connected together. For example, a 12V car battery typically includes 6 battery cells connected in series and has about 800 Watt-hours (W-hr) of storage (about 300-400 useable W-hrs). The battery cells 10 can be connected by connectors 42 to main battery terminals 44 and 46 in parallel (as shown in FIG. 2), in series (as shown in FIG. 3) or combinations thereof.

Figure 4A:
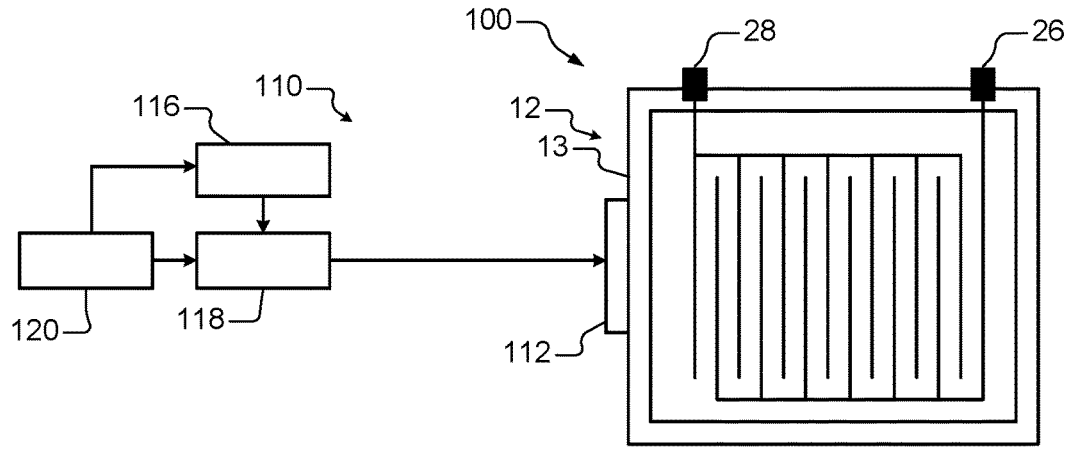
FIG. 4A is a functional block diagram of an example of a battery including an electrolyte agitator attached to a battery enclosure wall according to the present disclosure.

Referring now to FIG. 4A, a desulfation system 110 according to the present disclosure includes a battery 100 and an electrolyte agitator 112 attached to one or more of the walls 13 of the enclosure 12. In some examples, the electrolyte agitator 112 is attached to an outer surface of the wall 13 and generates waves in the electrolyte through the wall 13. In some examples, the electrolyte agitator 112 includes a piezoelectric device such as a piezoelectric cantilever. In other examples, the electrolyte agitator 112 includes an electromagnetic device, a magnetorestrictive device and/or a motor that generate waves in the electrolyte. In some examples, the motor includes an eccentric shaft to cause vibration.

A controller 116 is connected to a driver circuit 118. The controller 116 selectively actuates the driver circuit 118 while the vehicle is driving or parked to cause the electrolyte agitator 112 to vibrate or resonate at a predetermined frequency. For example, the controller 116 selectively actuates the electrolyte agitator 112 after a predetermined period elapses without operation of the vehicle. In some examples, the controller 116 repeats the process periodically thereafter.

In some examples, a power source 120 includes the battery 100 which powers the desulfation system 110. In other examples, a separate power source 120 such as another battery or plug in connection to a utility may be used to power the controller 116 and the driver circuit 118. Alternately, the heating can be performed while the vehicle is running using the battery. In some examples, the controller 116 is implemented by an existing vehicle controller. In some examples, the controller 116 and the driver 118 are combined.

Figure 4B:
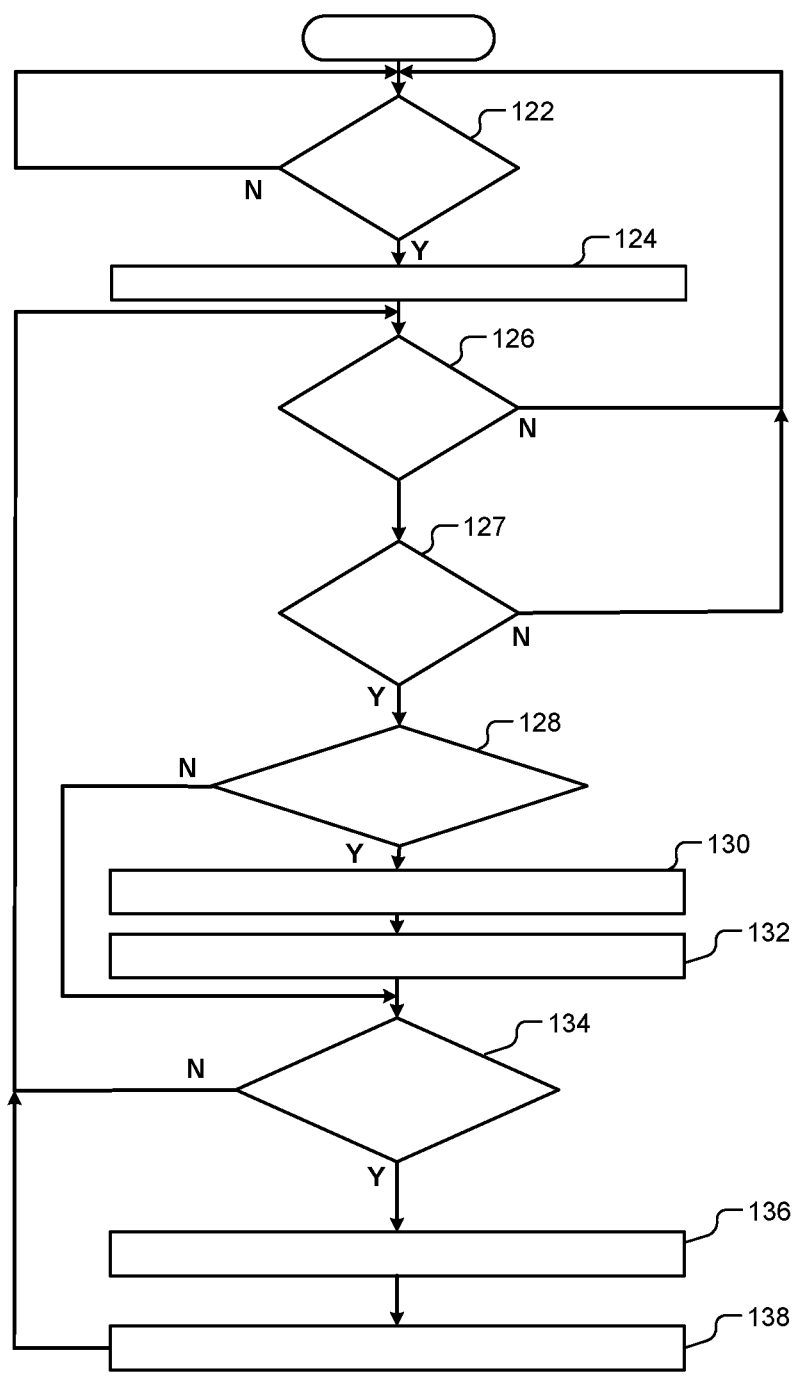
FIG. 4B is a flowchart of an example of a method for agitating the electrolyte according to the present disclosure.

Referring now to FIG. 4B, an example of a method for agitating electrolyte in a lead acid battery to desulfate the battery is shown. At 122, the method determines whether the vehicle transitions from on to off. If 122 is false, the method returns to 122. If 122 is true, the method resets and starts first and second timers at 124. At 126, the method determines whether the vehicle is in an off state. At 127, the method determines whether a battery SOC is greater than an SOC threshold ($SOC_{TH}$). At 128, the method determines whether the first timer is greater than or equal to a first predetermined period at 128. If 128 is false, the method continues at 134 described below.

If 128 is true, the method drives voltage (greater than battery voltage) across terminals of the battery at 130 to optionally perform voltage pulsing. At 132, the method resets the first timer. At 134, the method determines whether the second timer is greater than or equal to a second predetermined period. If 134 is false, the method returns to 126. If 134 is true, the method drives the electrolyte agitator at 136 and resets the second timer at 138.

In some examples, the voltage pulsing is not performed and heating is performed at periodic intervals. In still other examples, voltage pulsing and heating are performed in addition to electrolyte agitation. In other examples, voltage pulsing and/or heating are performed at the same time as the electrolyte agitation and the method is simplified accordingly.

Figure 5A:
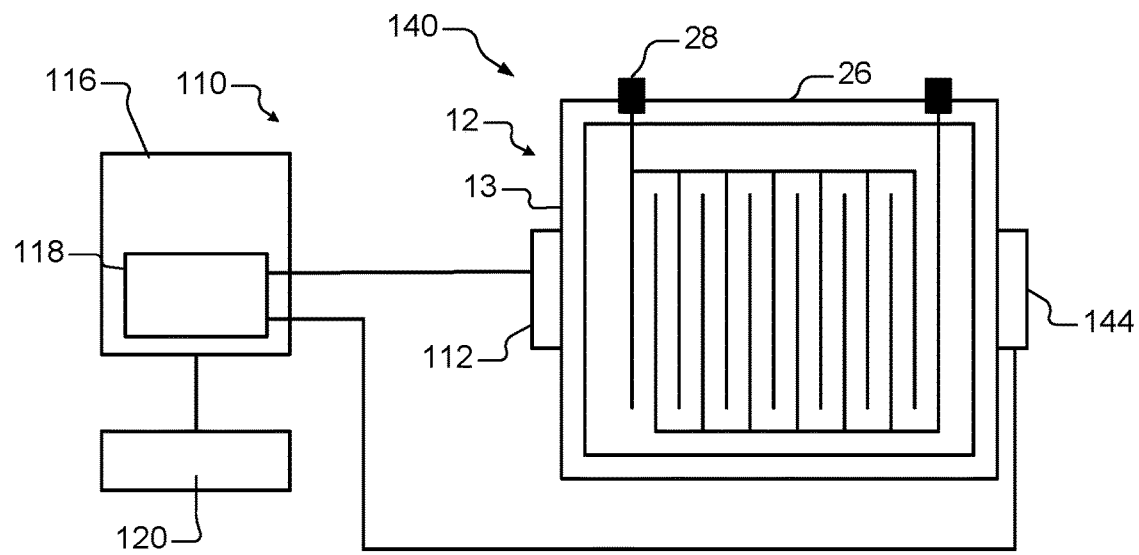
FIG. 5A is a functional block diagram of an example of a battery including multiple electrolyte agitators attached to outer surfaces of battery enclosure walls according to the present disclosure.

Referring now to FIG. 5A, a desulfation system 140 includes the electrolyte agitator 112 and one or more additional electrolyte agitators 144 attached to the walls 13 of the enclosure 12. In some examples, the electrolyte agitators 112 and 144 are attached to outer surfaces of the walls 13, although other locations are contemplated. In this example, the driver 118 is combined with the controller 116.

Figure 5B:
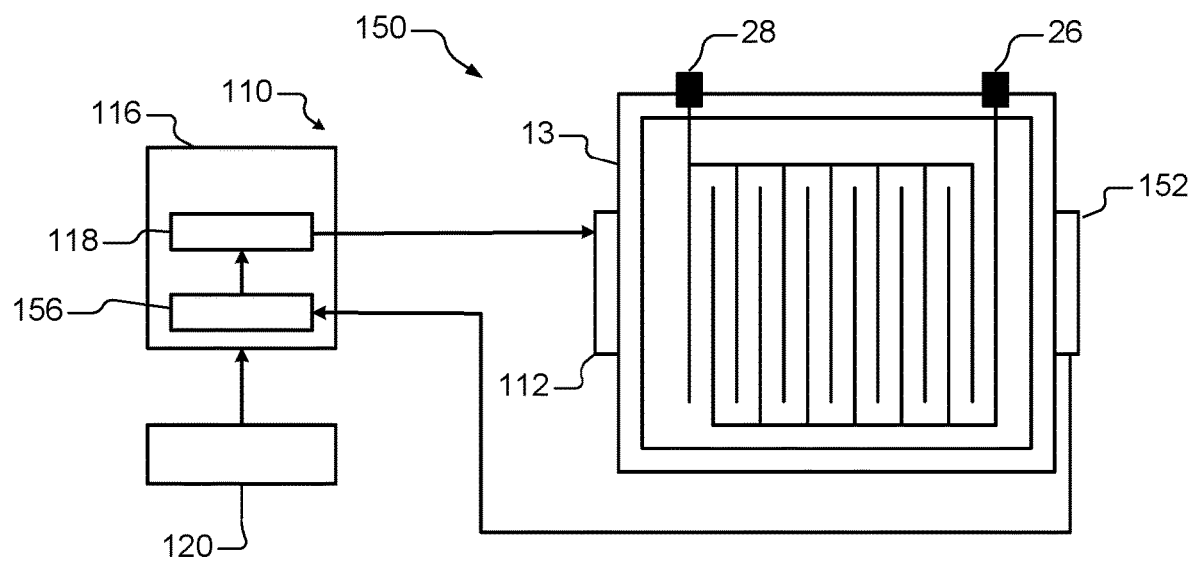
FIG. 5B is a functional block diagram of an example of a battery including an electrolyte agitator and a feedback device attached to outer surfaces of battery enclosure walls according to the present disclosure.

Referring now to FIG. 5B, a desulfation system 150 includes one or more of the electrolyte agitators 112 and one or more feedback detectors 152 attached to the walls 13 of the enclosure 12. In some examples, the electrolyte agitator(s) 112 is (are) attached to outer surfaces of the walls 13, although other locations are contemplated. In some examples, the one or more feedback detectors 152 include piezoelectric devices that are used to generate a feedback signal. The controller 116 receives the feedback signal from the one or more feedback detectors 152 and adjusts operation of the one or more electrolyte agitators 112 based thereon. In some examples, the controller 116 adjusts a drive signal frequency, timing and/or amplitude to alter vibration characteristics or resonant frequency of the one or more electrolyte agitators 112.

Figure 6A:
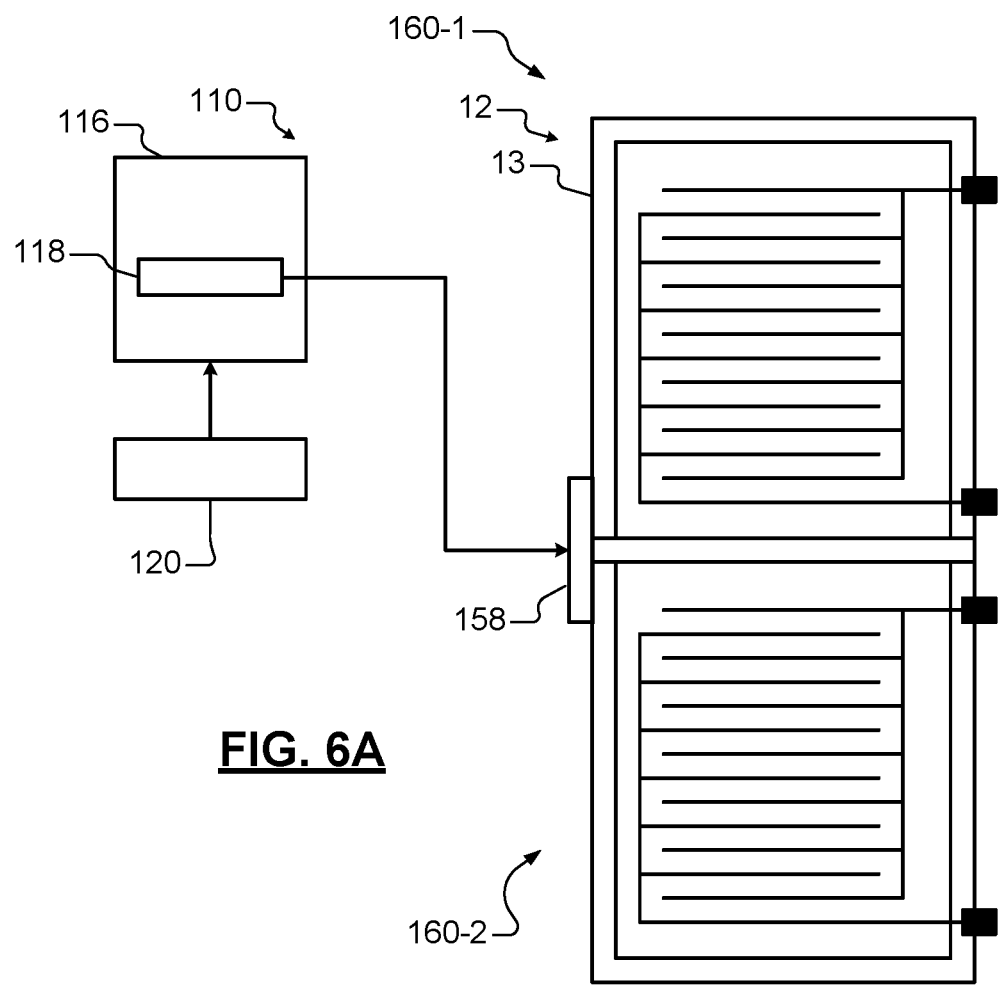
FIG. 6A is a functional block diagram of an example of a battery including an electrolyte agitator attached to an outer surface of battery enclosure walls (spanning two or more adjacent battery cells) according to the present disclosure.
Figure 6B:
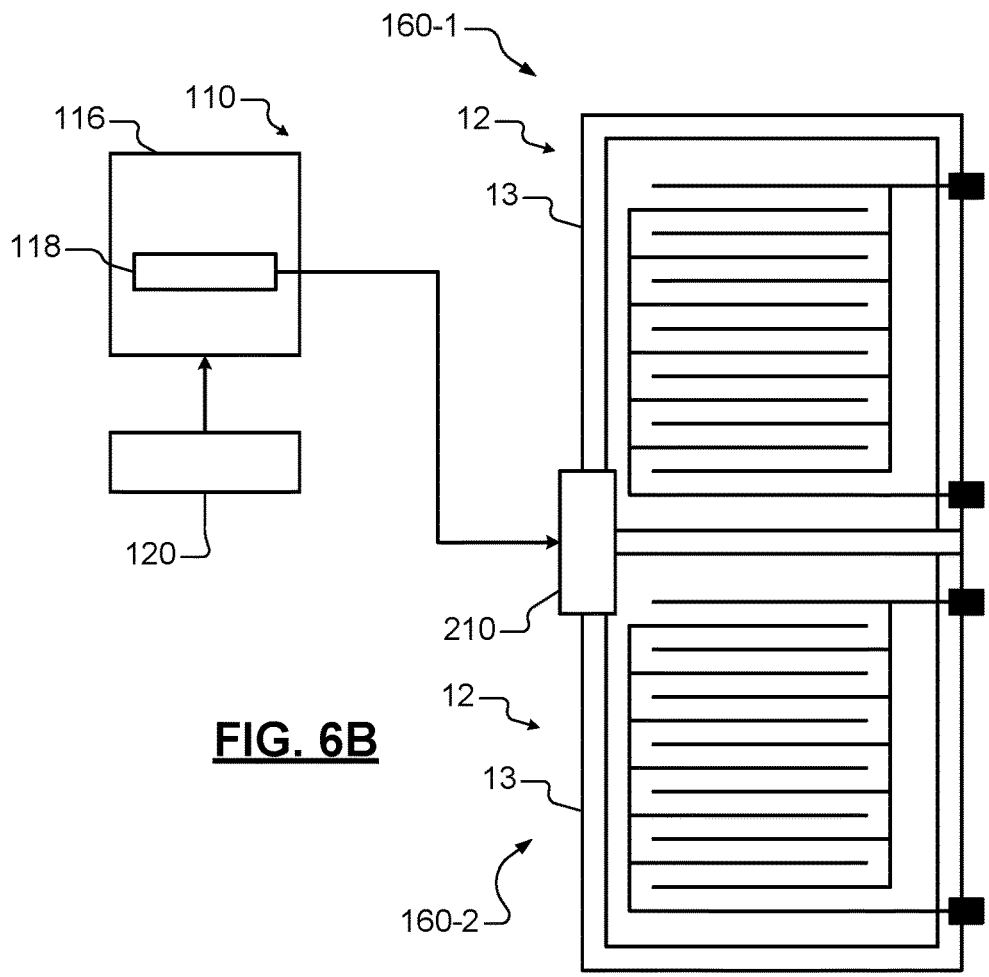
FIG. 6B is a functional block diagram of an example of a battery including an electrolyte agitator exposed to electrolyte and spanning two or more adjacent battery cells according to the present disclosure.

As can be appreciated, the electrolyte agitators can be arranged in other locations of the battery. Referring now to FIGS. 6A and 6B, electrolyte agitators are shown attached to outer walls of adjacent battery cells 160-1 and 160-2, respectively, in a location spanning the adjacent battery cells 160-1 and 160-2. In FIG. 6A, an electrolyte agitator 158 is attached to the wall 13 outside of the enclosure 12. In FIG. 6B, an electrolyte agitator 210 is attached to the wall 13 fully or partially inside of the enclosure 12. In some examples, at least a portion of an enclosure of the electrolyte agitator 210 is in direct contact with the electrolyte.

Figure 7:
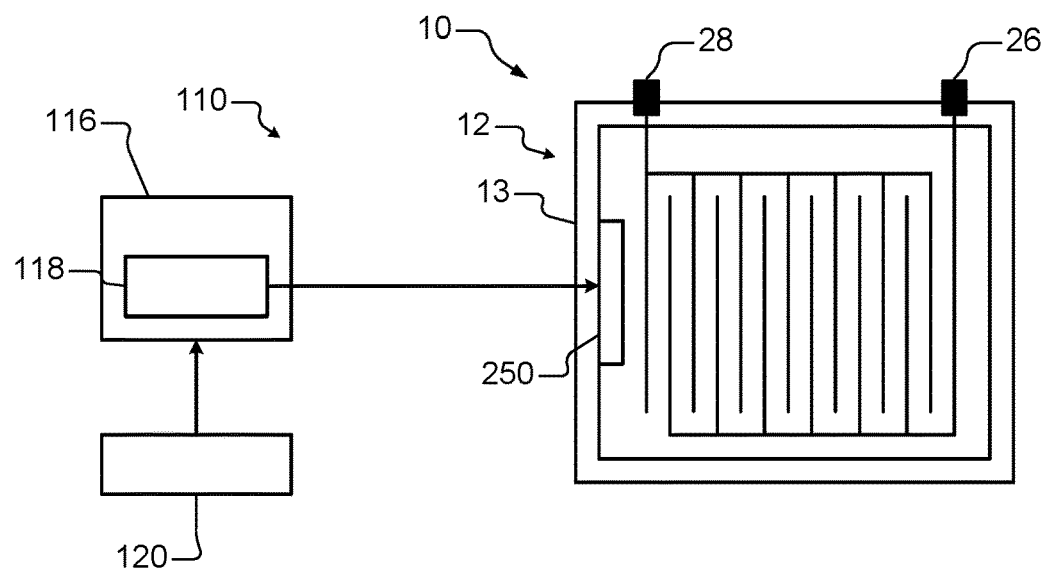
FIG. 7 is a functional block diagram of an example of a battery including an electrolyte agitator arranged on an inner surface of a battery enclosure wall of the battery cell according to the present disclosure.
Figure 8:
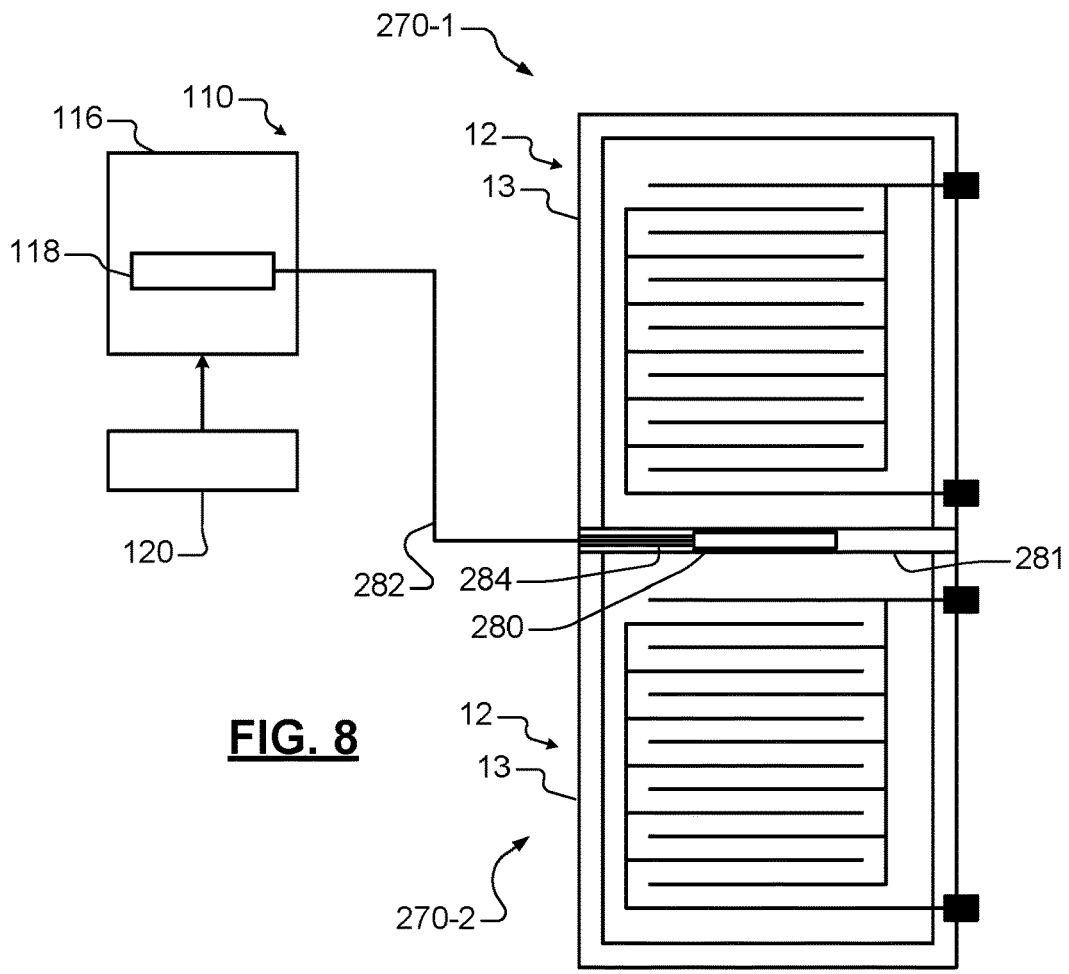
FIG. 8 is a functional block diagram of an example of a battery including an electrolyte agitator arranged in a battery enclosure wall of the battery cell between two adjacent battery cells according to the present disclosure.
Figure 9:
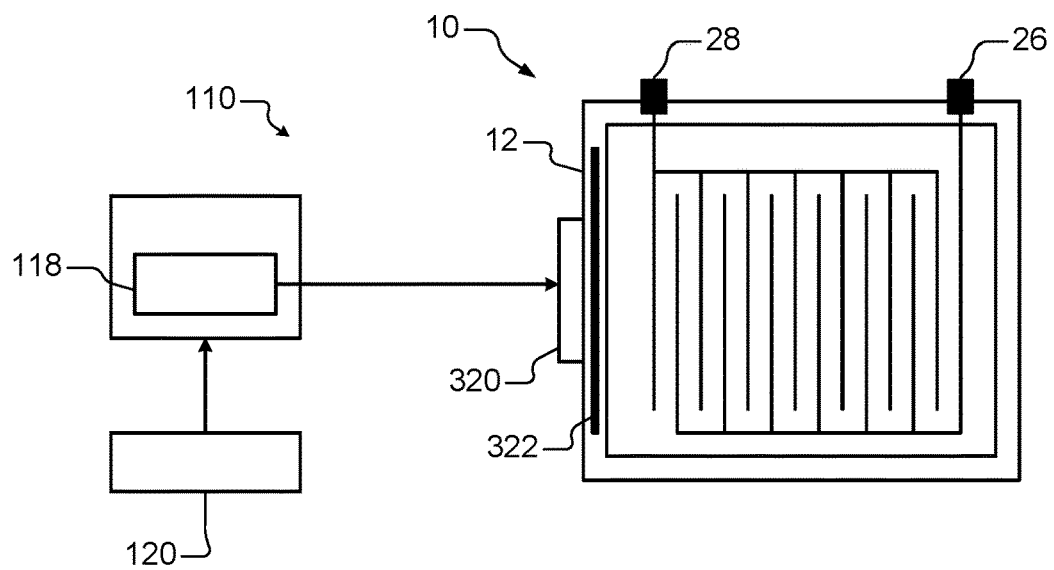
FIG. 9 is a functional block diagram of an example of an energy dispersion device arranged an electrolyte agitator and a battery according to the present disclosure.

Referring now to FIGS. 7-9, still other examples of arrangement locations for the electrolyte agitator are shown. In FIG. 7, an electrolyte agitator 250 is arranged on an inner surface of the wall 13 of the enclosure 12 inside of the enclosure 12. In some examples, at least a portion of an enclosure of the electrolyte agitator 250 is in direct contact with the electrolyte.

In FIG. 8, an electrolyte agitator 280 is embedded in a wall 281 separating adjacent battery cells 270-1 and 270-2. In some examples, the electrolyte agitator 280 is connected by an insulated conductor 282 (though a passage 284 in the wall 281) to the controller 116 and/or drive circuit 118.

In FIG. 9, one or more electrolyte agitators 320 are arranged on the wall 13 of the enclosure 12. An energy dispersion device 322 is arranged in or on the wall 13 to absorb vibrational energy from the one or more electrolyte agitators 320 and to uniformly disperse the vibrational energy in the wall 13 and/or the electrolyte.

Figure 10:
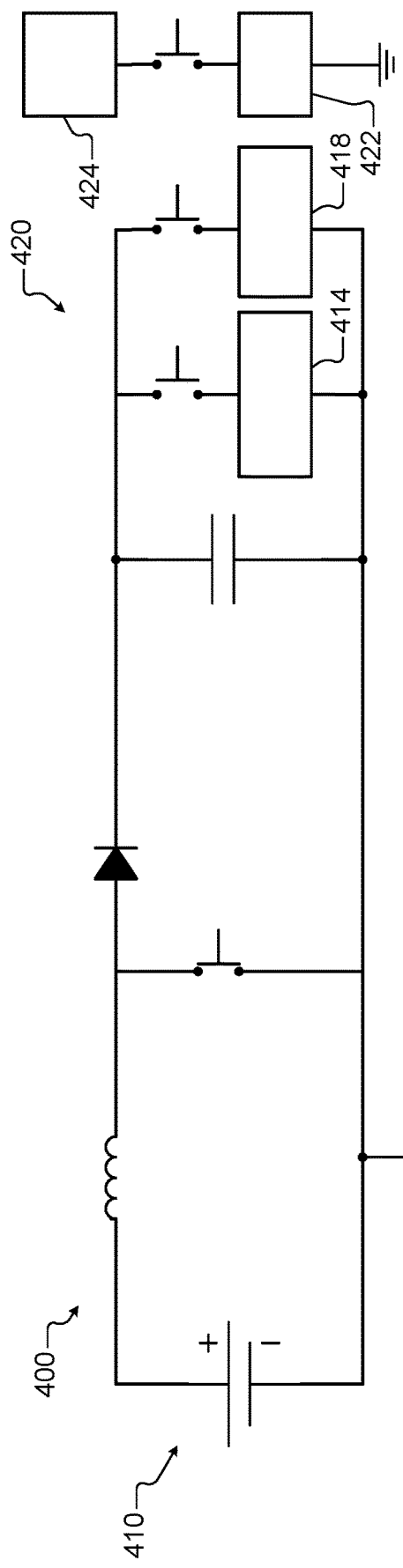
FIG. 10 is an electrical schematic of an example of a drive circuit according to the present disclosure.
Figure 11:
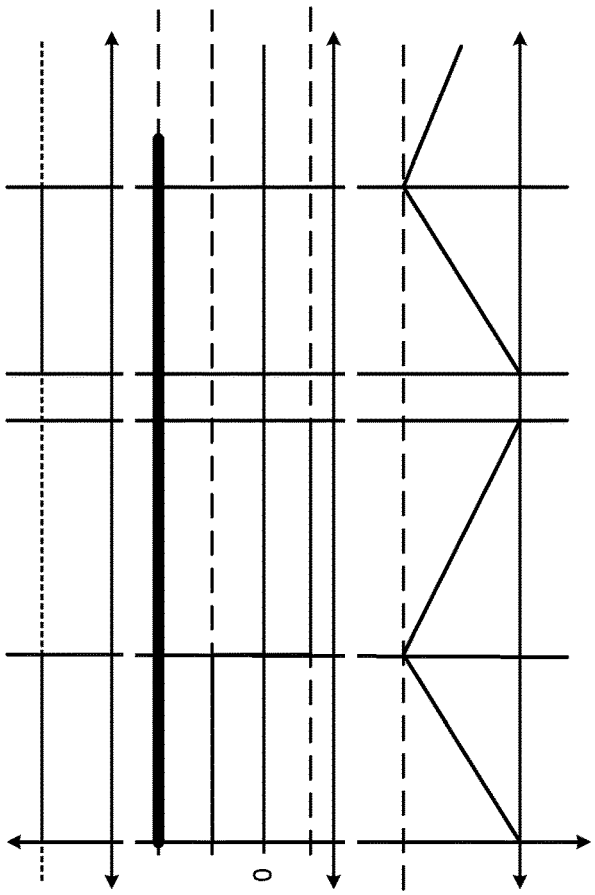
FIG. 11 is a graph illustrating an example of voltage and current waveforms for the drive circuit of FIG. 10 according to the present disclosure.

Referring now to FIGS. 10 and 11, a driver circuit 400 may be implemented by a flyback circuit to provide voltages above the battery voltage. For example, the flyback circuit may be used to supply 14V to 16 V (or higher) from a 12V battery system. The driver circuit 400 includes a power source 410 such as a battery. The drive circuit 400 further includes an inductor L and a switch SW. An anode of a diode D is connected between the inductor L and the switch SW. A cathode of the diode D is connected to a capacitor C and to one or more electrolyte agitators 414 and a battery 418 via switches SW2 and SW3, respectively. A heater 422 may be used to heat the battery and the electrolyte and is selectively connected to an auxiliary power source 424 such as a power cord to a utility or another battery.

During operation of the vehicle, the inductor L is charged by the power source 410 when the switch SW is closed. After the vehicles has been parked for a predetermined period, the switch SW can be opened to allow the inductor to discharge into the capacitor C and/or loads. The switches SW2 and/or SW3 can be closed and/or modulated on/off to supply power to the electrolyte agitator 414 and/or the battery 418. The inductor L can be recharged one or more times and the discharge process can be repeated. After agitating the electrolyte for a predetermined period or number of cycles, the vehicle stops agitating the electrolyte and waits another predetermined period (without vehicle operation) before repeating the process of agitating the electrolyte. In FIG. 11, voltage and current waveforms for the drive circuit of FIG. 10 are shown.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A battery maintenance system comprising:
an enclosure including a plurality of walls;
a plurality of battery cells located in the enclosure and surrounded by electrolyte; and
an electrolyte agitator attached to an outer surface of at least one of the walls of the enclosure, the electrolyte agitator configured to selectively agitate the electrolyte.

2. The battery maintenance system of claim 1, wherein the plurality of battery cells include lead acid battery cells and wherein the electrolyte includes sulfuric acid.

3. The battery maintenance system of claim 1, wherein the electrolyte agitator includes a piezoelectric device.

4. The battery maintenance system of claim 1, wherein the electrolyte agitator includes a piezoelectric cantilever.

5. The battery maintenance system of claim 1, further comprising an energy dispersion material located between the electrolyte agitator and the electrolyte.

6. The battery maintenance system of claim 1, further comprising:
a feedback device attached to the enclosure; and
a controller configured to control the electrolyte agitator in response to feedback from the feedback device.

7. The battery maintenance system of claim 6, wherein the electrolyte agitator includes a first piezoelectric device and the feedback device includes a second piezoelectric device.

8. The battery maintenance system of claim 1, further comprising a flyback circuit to selectively provide power to the electrolyte agitator.

9. A vehicle battery system for a vehicle, the vehicle battery system comprising:
the battery maintenance system of claim 1; and
a controller configured to determine when the vehicle has not been operating for a predetermined period and to cause the electrolyte agitator to agitate the electrolyte after the predetermined period.

10. The vehicle battery system of claim 9, wherein the controller is further configured to cause voltage pulses to be applied to the plurality of battery cells while the vehicle is not operating.

11. The vehicle battery system of claim 9, wherein the controller is configured to prevent the electrolyte agitator from agitating the electrolyte after the predetermined period if a battery state of charge is less than a predetermined state of charge.

12. The vehicle battery system of claim 9, wherein the controller is configured to cause the electrolyte agitator to agitate the electrolyte within a predetermined period prior to starting the vehicle.

13. A vehicle battery system for a vehicle, the vehicle battery system comprising:
an enclosure including a plurality of walls;
a plurality of battery cells located in the enclosure and surrounded by electrolyte;
an electrolyte agitator,- attached to an outer surface of at least one of the walls of the enclosure, the electrolyte agitator configured to selectively agitate the electrolyte;
a drive circuit configured to selectively drive the electrolyte agitator; and
a controller configured to determine when the vehicle has not been operating for a predetermined period and to selectively cause the drive circuit to drive the electrolyte agitator after the predetermined period.

14. The vehicle battery system of claim 13, wherein the controller is configured to prevent the electrolyte agitator from agitating the electrolyte after the predetermined period if a battery state of charge is less than a predetermined state of charge.

15. The vehicle battery system of claim 13, wherein the controller is configured to cause the electrolyte agitator to agitate the electrolyte within a predetermined period prior to starting the vehicle.

16. A battery maintenance system comprising:
an enclosure including a plurality of walls;
a plurality of battery cells located in the enclosure and surrounded by electrolyte;
a piezoelectric device arranged in at least one of the plurality of walls separating adjacent ones of the plurality of battery cells, the piezoelectric device configured to selectively agitate the electrolyte;
a flyback circuit configured to selectively drive the piezoelectric device; and
a controller configured to selectively cause the flyback circuit to output power to the piezoelectric device.

17. The battery maintenance system of claim 16, wherein:
the plurality of battery cells include lead acid battery cells;
the electrolyte includes sulfuric acid; and
the piezoelectric device includes a piezoelectric cantilever.

18. The battery maintenance system of claim 16, further comprising an energy dispersion material located between the piezoelectric device and the electrolyte.

19. The vehicle battery system of claim 13, further comprising an energy dispersion material located between the electrolyte agitator and the electrolyte.

20. The vehicle battery system of claim 13, wherein:
the electrolyte agitator includes a first piezoelectric device;
the vehicle battery system further comprises a feedback device attached to the enclosure;
the feedback device includes a second piezoelectric attached to the enclosure; and
the controller is configured to selectively cause the drive circuit to drive the electrolyte agitator in response to feedback from the feedback device.

\* \* \* \* \*